United States Patent Office 3,384,610
Patented May 21, 1968

3,384,610
FLUIDIZED BED COATINGS CONTAINING POWDERED EPOXY RESIN COMPOSITIONS AND METHOD FOR PREPARING THE SAME
Max M. Lee, Fort Wayne, Ind., assignor to The Dexter Corporation, a corporation of Connecticut
No Drawing. Filed May 25, 1964, Ser. No. 370,080
12 Claims. (Cl. 260—37)

ABSTRACT OF THE DISCLOSURE

An epoxy resin coating composition adapted for low temperature film formation and rapid cure on pre-heated substrates, said composition comprising a uniform mixture of powdered components having a particle size within the range of about 5 to 600 microns, a first powder in said mixture consisting essentially of a partially reacted mixture of epoxy resin having an epoxy equivalency between 1.0 and 2.0, a molecular weight within the range of 450–2550, and a softening point above 65° C., and about 0.5 to 5% based on the weight of resin of a $BF_3$-amine complex soluble in said resin, and a second powder in said mixture consisting essentially of a solid, friable, non-agglomerable polycarboxylic acid anhydride, the amount of said second powder being sufficient to provide 0.25 to 1.0 equivalents of anhydride per equivalent of epoxy resin, and said composition having the characteristic of being stable to storage for long periods of time as free-flowing powder while fusing and coalescing to a continuous coating at a temperature above about 100° C.

These compositions can be unfilled, or can contain fillers and coloring agents with the combined amounts thereof not exceeding 70% by weight of the overall composition, and preferably not exceeding 25% by weight when flexibility is desired in the cured composition. In both the filled and unfilled compositions the presence of about 0.5 to 3 parts of colloidal silica per 100 parts by weight of resin, in the form of separate particles uniformly blended in the powder, serves to prevent sag and improve edge and corner coverage by the fused composition during gelation and cure.

The technique of coating heated articles, such as those of metal, by dipping them or tumbling them in a suspended or static bed of resinous coating powder or by spraying or sprinkling coating powder thereon, is well known, and is readily utilized for coating articles of diverse shapes. Particularly effective in coating articles of irregular and undercut contours, is the so-called "fluidized bed" process. In this process a clean, pre-heated article is dipped for a short period of time into a fusible plastic powder, which is maintained in a fluidized state by an ascending current of gas passing through it. On striking the hot article, the powder fuses and clings to its surface. After withdrawal from the fluidized bed, the clinging particles may melt, coalesce, and cure into a smooth, continuous coating by the reaction of the residual heat of the article, or alternatively, such cure may require supplemental heating in an oven. The powdered plastic, while in the fluidized state, behaves like a boiling liquid. It offers little resistance to immersion, seeks small openings, and readily coats all surfaces with which it comes into contact. Coatings applied by this fusion process offer several distinct advantages over conventional coating methods. Thick, non-sag coatings up to 50 to 60 mils thick can be applied by this process in one application, whereas coatings only a few mils thick can be applied from conventional solvent solutions. This process also avoids the use of volatile solvents, and the attendant costs and hazards caused by the solvent.

The formulation of fusible powdered coating compositions for application by the fluidized bed or spraying process, introduces requirements for film-forming materials, which are unlike those heretofore encountered in the formulation of conventional coatings, and which are new in the protective coating industry. The film-forming material must be a solid, which is capable of fusing at an elevated temperature below that at which it chars, or otherwise decomposes to any substantial degree. The material must be friable, and capable of reduction to a free-flowing powder form during storage, without agglomeration or cold-flow.

The powder must be capable of being converted to a tough, insoluble, infusible coating at moderate temperatures. Often objects to be coated are comprised in part of heat-sensitive components, such as paper, cloth, organic coatings, and molded plastics, which cannot tolerate temperatures above 250–300° F. for prolonged periods of time, since such heat-sensitive materials may evolve gases and fumes during the post-curing operation, results in bubbles, pin-holes, and cracks in the cured coating. Presently available powdered epoxy compositions invariably require that the object to be coated be pre-heated at a minimum temperature of about 300° F., and the deposited coating post-cured at this temperature for prolonged periods of time with the result that their use for coating objects by this method have been greatly restricted to non-heat-sensitive materials. Furthermore, in many cases it is desirable that the powder be capable of being converted to its tough insoluble, infusible state without a curing operation after the powder is deposited on the preheated substrate.

Some otherwise desirable epoxy resin powder compositions that can be applied at moderate temperatures, or do not require a post-curing operation, are restricted in their use, because of their limited shelf-life due primarily to the high reactivity of the resin-hardener systems. In order to prolong the shelf-life, it is often desirable to blend finely divided, solid, friable, non-agglomerable moderately active hardeners with finely divided, solid, friable, non-agglomerable epoxy resins, rather than prepare powdered compositions from their molten solutions. Powdered compositions prepared from moderately active hardeners by this method invariably require a post-curing operation.

From the above, it will be evident that there is a definite need for a free-flowing, powdered, fusible epoxy resin system which is stable in storage at ordinary room temperatures, and which will convert to a smooth non-porous, infusible, insoluble coating without additional heating when deposited on a preheated substrate. It is also evident that there is a definite need for such systems that will cure in a reasonably short time at temperatures not detrimental to heat-sensitive substances, such as paper, cloth, coatings, or molded plastics.

A principal object of this invention is to provide free-flowing, fusible powdered epoxy resin compositions, which are stable for extended periods of storage at room temperature, and which at the same time, when deposited on preheated substrates, can be converted to smooth, continuous, infusible, insoluble coatings by short exposure to elevated temperatures as low as about 250° F.

Another object of the invention is to provide in free-flowing, fusible powdered epoxy resin compositions, unique hardener and catalyst components, which impart long shelf-life to the powdered compositions, while permitting conversion to the insoluble, infusible state at temperatures within the range of about 250 to 300° F., facilitating use on temperature sensitive substrates.

Still another object of this invention is to provide powdered, fusible non-agglomerable epoxy resin systems having time-temperature curing characteristics, which permit conversion to the infusible, insoluble state without post-curing when deposited on properly preheated substrates.

The novel epoxy resin compositions according to the present invention are based on the use of a combination of two different types of epoxy resin hardeners, more particularly a combination of an anhydride of a polycarboxylic acid and a hardener or catalyst of the Lewis acid type, such as a complex of an amine with boron trifluoride, incorporated into the epoxy resin in such a manner that little reaction, or curing occurs while stored in the solid powdery state at ordinary room temperature, but the curing is greatly accelerated when moderately heated to its fusible state.

The catalysts, or Lewis acid type hardeners are basically complexes of an amine with boron trifluoride, and particularly those that impart long shelf-life at ordinary room temperature when intimately mixed, or when in direct contact with the epoxy resin. Typical boron trifluorideamine complexes that are especially suitable for compositions in accordance with the present invention, are boron trifluoride - monoethylamine, boron trifluoride-dibenzylamine, boron trifluoride - monohexylamine, boron trifluoride - piperidine, and boron trifluoride-2-ethylhexylamine, as well as mixtures of these. The boron trifluoride complex, or combinations of complexes, may be incorporated into the epoxy resin in its normal solid state, or may be first dissolved in a suitable solvent, such as a polyglycol, for example, butanediol, or tetraethylene glycol, and then incorporated into the epoxy resin, so as to obtain complete uniformity and rapid mixing.

The concentration of boron trifluoride complex used will vary from 0.5 to 5.0%, based on the weight of the epoxy resin, depending on the percent boron trifluoride in the complex, the epoxy equivalent of the epoxy resin, and the degree of reactivity desired in the formulated epoxy resin system.

The anhydride hardeners used in the new compositions can be any solid, friable, non-agglomerable anhydrides of polycarboxylic acids. Typical examples of such solid, friable, non-agglomerable (i.e. solid, grindable) anhydrides are tetrahydrophthalic anhydride, cyclopentane tetracarboxylic dianhydride, hexachloro endomethylene tetrahydrophthalic anhydride, hereinafter referred to as "het" anhydride, pyromellitic dianhydride, trimellitic anhydride, glycerol tris trimellitate anhydride (including a commercial grade marketed as "TMX–330" by Amoco Chemicals Corporation), and benzophenone tetra carboxylic dianhydride. The anhydride type of hardener must be in a finely divided form, preferably of a size that 95% will pass through a 100 mesh sieve. The concentration of anhydride hardener may be varied within the range of about 0.25 to 1.0 equivalent of anhydride per equivalent of epoxy resin. The preferred amount of anhydride in a particular composition will depend in part on the amount of boron trifluoride-amine complex being used, and in part on the reactivity and cure rate desired in the composition. As a general guide, increase in proportion of catalyst to anhydride tends to increase reactivity and reduce the cure temperature, while increase in the proportion of catalyst and anhydride to resin tends to reduce the curing time.

Typical epoxy resins utilized in my invention are those produced by the reaction of one or more mols of epichlorohydrin, or glycerol dichlorohydrin with a mol of a dihydric phenol compound, such as bisphenol A, in the presence of a base such as sodium hydroxide, and at elevated temperatures within the approximate range of 50° to 150° C. The solid glycidyl polyether obtained from epichlorohydrin and bisphenol A is a complex mixture, rather than a single chemical compound which has been represented by the general formula:

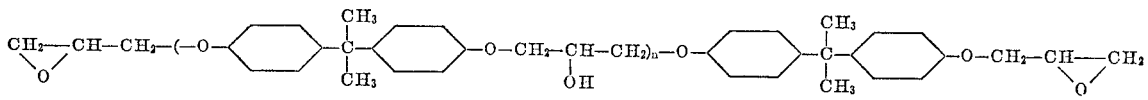

Preferred resins for use in the present invention are those in which $n$ has an average value varying from about 2 to about 8; and a number of such resins are commercially available. Expressed in other terms, the preferred resins are those resins or resin mixtures having an epoxy equivalent greater than 1.0 and an equivalent weight within the range of about 450 to 2550, and a melting point over 65° C., and suitably within the range of about 65° C. to 150° C. Although the solid reaction products from epichlorohydrin with bisphenol A are most commonly employed in compositions of the present invention, the reaction products of epichlorohydrin with other dihydric phenols, such as for example resorcinol (1,3 benzenediol) may also be used. Mixtures or blends of resins, including blends of liquid resin and resin having a softening point higher than 150° C., can be employed provided the mixture or blend is a solid, friable material having an epoxide equivalent greater than 1.0, a melting point within the range of about 65° C. to 150° C., and an equivalent weight in the 450 to 2550 range.

In preparing powdered epoxy resin compositions suitable for fluidized-bed or spraying applications that can be applied at low temperatures, or which require no post-curing, the boron trifluoride complex is incorporated into the epoxy resin by first heating, with stirring, the epoxy resin to above its softening point until it is completely liquid. If fillers, pigments, colorants, or flexibilizers are to be used, it is best that these be added at this time to the molten resin with stirring until a uniform mixture is obtained. The temperature of the mixture is then reduced, preferably in the range of 200° F. to 260° F., depending on the reactivity of the boron trifluoride complex that is to be added. The BF$_3$ complex is added rapidly with stirring in a minimum of time. The uniform mixture is immediately cast into shallow receptacles to cool and solidify rapidly. The solid, after cooling, is broken into small pieces and pulverized, as in a hammer mill, to a finely divided state, preferably of a size that 95% will pass through a 60 mesh or finer standard sieve. An alternate method is to blend the resin with the BF$_3$ complex and any fillers desired on a heated 2-roll plastics mill at the softening point temperature of the resin until thorough mixing is obtained, followed by cooling and pulverizing as above described.

The powder obtained in the above manner is then mixed with a powdered anhydride of a polycarboxylic acid, or a combination of anhydrides in a dry blender, a ball-mill or roll mixer until a uniformly dispersed blend of the two powders is obtained.

When transparent coatings are desired, the composition may contain only the resin, the boron trifluoride catalyst, and the blended-in anhydride, together with a small amount of flow control agent, such as colloidal silica, suitably about 0.5 to 3.0 parts per 100 parts by weight of resin. The colloidal silica is understood to include any finely divided silica having an average particle size below about one micron. It prevents sag during cure, and improves edge and corner coverage of the fused coating prior to its gelation during cure, and is also useful for this purpose in compositions which may contain filler and/or pigments.

The colloidal silica is best incorporated into the powder during the dry blending of the powdered anhydride with the powdered epoxy resin-boron trifluoride complex.

It is frequently desirable to provide opacity and/or color in the coating by the addition of filler components, including pigments and/or inert mineral fillers. Such filler components should suitably be of a particle size less than 325 mesh, and can include any conventional pigments and mineral fillers which are compatible with the epoxy resin and hardener, and stable at the temperatures needed to provide for normal curing conditions. Typical coloring agents, or pigments, which can be employed are phthalocyanine blues and greens, mercury-cadmium and iron oxide reds, and titanium dioxide white. Typical inert mineral fillers, which can be employed, include mica, silica, silicates, talcs, barytes, and the like.

Coloring agents and filler components are preferably incorporated in the fused epoxy resin, and uniformly blended therewith prior to addition of the $BF_3$-amine complex, so that upon cooling and pulverizing, the color and filler components are an integral part of the activated resin powder particles. The amount of filler components included in a powdered resin composition can vary considerably, depending upon the properties desired in coatings formed therewith. Where maximum flexibility is desired, the quantity of filler components should be kept at the minimum required to provide opacity and/or color. Impact resistance will be decreased as the amount of filler components is increased, so that it is preferable to keep the concentration of filler below 25% if coatings having high impact resistance are desired. Where neither flexibility nor impact resistance are critical factors, the amount of filler can be as high as about 70% of the composition.

The following examples will serve to illustrate the preparation of typical powdered systems comprised of epoxy resin, Lewis acid catalyst, and anhydrides of polycarboxylic acids to yield compositions suitable for fluidized-bed and spraying applications, but it is to be understood that these examples are given by way of illustration and not of limitation.

Example I

One hundred parts by weight of an epoxy resin formed by the reaction of bisphenol A with epichlorohydin and characterized by an epoxy equivalent (grams of resin containing one equivalent of epoxide) within the range of 850–1025 and a Durran's softening point of 95° C.–105° C. was heated with stirring to a temperature in the range of 130°–140° C. until completely liquid. One part by weight of an iron oxide pigment of a particle size less than 80 mesh and three parts by weight of a solution of boron trifluoride-monoethylamine in butanediol (equal parts by weight) were added with rapid stirring for a period of approximately five minutes. The mixture was then cast while in a fluid state into a shallow tray and allowed to cool and solidify. The solid, on cooling to room temperature was broken into small pieces, then passes through a hammer mill to obtain a particle size finer than 60 mesh. One hundred and four parts of the powdered composition as described, twenty parts of trimellitic anhydride of a particle size less than 80 mesh, and two and one-half parts of a powdered silica having a particle size less than one micron were dry blended together. A clean steel bar, 0.5 x 0.5 x 4 inches was heated to a temperature of 200° C., and while at this temperature, immersed in a fluidized-bed of this dry blend for a period of several seconds. A smooth, uniform fused coat was deposited on removal from the fluidized-bed which converted to the cured, insoluble, infusible state while cooling to room temperature.

Coating compositions having similar properties are obtained with the 20 parts of trimellitic anhydride in the foregoing example are replaced with one of the following anhydrides:

| | Parts |
|---|---|
| Tetrahydrophthalic anhydride | 16 |
| Hexachloroendomethylene tetrahydrophthalic anhydride | 35 |
| Pyromellitic dianhydride | 10 |
| Cyclopentane tetracarboxylic dianhydride | 10 |
| Benzophenone tetracarboxylic dianhydride | 15 |
| Glycerol tris trimellitate anhydride | 21 |

Likewise coating compositions having similar properties are obtained when the $BF_3$-monoethylamine employed in the foregoing example is replaced by one of the following $BF_3$ complexes:

| | Parts |
|---|---|
| $BF_3$-dibenzylamine | 3.5 |
| $BF_3$-hexylamine | 2.2 |
| $BF_3$-2-ethylhexylamine | 2.5 |
| $BF_3$-piperidine | 2.1 |

Example II

One hundred parts by weight of an epoxy resin formed by the reaction of bisphenol A with epichlorohydrin and characterized by an epoxy equivalent within the range of 550–650 and a Durran's softening point of 75°–85° C. were brought to the molten state by heating with continuous stirring to a temperature of 150° C. Fifty parts of predried powdered silica having a particle size of 95% passing through a 325 mesh screen, one-half part of a powdered titanium dioxide pigment, and one-tenth part of a phthalocyanine green pigment, all parts by weight, were mixed with the molten resin until a good dispersion was obtained. The temperature was reduced to approximately 110° C. and two parts by weight of finely powdered boron trifluoride-dibenzylamine complex were added with rapid stirring until complete solution was attained. The molten mixture was cast into shallow pans within a period of four minutes after the addition of the complex to cool rapidly and solidify. On cooling to room temperature, the solid was broken into small pieces and then powdered by means of a hammer mill such that 95% passed through a 100 mesh screen.

Example III

One hundred and fifty-three parts by weight of the powder as described in Example II, twenty-two parts by weight of glycerol tris trimellitate anhydride (Amoco Chemicals "TMX–330") having a particle size less than 80 mesh, and two parts by weight of a powdered silica having a particle size of one micron or less were dry blended together. A series of steel bars, 0.50 x 0.50 x 4 inches long were cleaned with steel wool and degreased with a solvent, were heated to a temperature of 200° C. and while at that temperature, immersed in a fluidized-bed of this powdered resin blend for different times ranging from one-half second to four seconds. After the bars were withdrawn from the fluidized-bed they were allowed to cool to room temperature while the coatings deposited thereon continued to cure due to the residual heat in the preheated bars. The coatings gelled within a few minutes while the bars were still hot. The coatings after cooling to room temperature were tough, smooth, uniform and glossy; and were unaffected when immersed in acetone for 30 minutes at room temperature, indicating that they had cured to an insoluble, infusible state. The coatings varied in thickness from 13 mils on the bar immersed for one-half second to 48 mils on the bar immersed for four seconds. When a clean steel bar, one inch by four inches by sixty mils thick was preheated to 140° C. and dipped at that temperature for three seconds in a fluidized-bed of the same powder, a smooth, uniform coating was deposited. The control bar was placed in an oven at 140° C. and the coating gelled within four minutes additional curing and converted to its insoluble, infusible state within forty minutes curing. The cured coating was unaffected when immersed in acetone for thirty minutes at room temperature.

Example IV

One hundred and fifty-three parts by weight of the powder as described in Example II, twenty parts by weight of tetrahydrophthalic anhydride of a particle size finer than 80 mesh, and three parts by weight of a finely powdered silica having a particle size less than one micron were dry blended together. A clean steel bar, one inch by four inches by 120 mils thick was heated to a temperature of 130° C. and while at this temperature, immersed in a fluidized-bed of the above described powder for four seconds. After the steel bar was removed from the fluidized-bed, it was maintained at 130° C. for a period of ninety minutes. After cooling, the coating was found to have an approximate thickness of nine mils and had a smooth, uniform finish. The cured coating was little affected when immersed in acetone at room temperature for a period of thirty minutes.

Example V

One hundred parts of an epoxy resin described in Example II were heated with stirring to a temperature of 130° C. until completely molten. Three parts by weight of boron trifluoride-2-ethylhexylamine complex were added with rapid stirring until complete solution was attained and then held at 130° C. for a short period of time until a noticeable increase in viscosity was observed. The viscous liquid was immediately poured into shallow trays to cool rapidly and solidify. The solidified resin system, at room temperature, was broken into small pieces and then pulverized by means of a hammer mill to a particle size finer than 60 mesh. One hundred parts by weight of the powder obtained in the above manner, twenty parts by weight of finely divided trimellitic anhydride powder, and three parts by weight of powdered silica having a particle size less than one micron were dry blended together. A steel bar, one-half inch by one-half inch by four inches long was heated to a temperature of 400° F., and while at this temperature, immersed in a fluidized-bed of the dry blended powder for one second. On removal, the powder fused rapidly to a smooth uniform coat. Within several minutes, the coating converted to a tough rubbery gel while still warm, and finally to a rigid, insoluble, infusible cured state on cooling to room temperature.

Example VI

Fifty parts by weight of an epoxy resin formed by the reaction of bisphenol A with epichlorohydrin and characterized by an epoxy equivalent weight within the range of 550–650 and a Durran's softening point of 75–85° C., and fifty parts of a similar resin characterized by an epoxy equivalent weight within the range of 825–1025 and a Durran's softening point of 95–105° C. were mixed with fifty parts of a —325 mesh quartz, 0.3 part of titanium dioxide pigment, 0.15 part of phthalocyanine green pigment and 2 parts of $BF_3$-dibenzylamine complex. The mixture was compounded on a hot 2-roll plastics mill, and then cooled, solidified, and pulverized, so that all of the particles would pass through a 60 mesh standard sieve. 100 parts by weight of this compound were then blended in a ball mill with 11.3 parts of glycerol tris trimellitate anhydride (Amoco Chemicals "TMX–330") which had been ground, so that it was finer than 80 mesh, and 1.1 parts of a colloidal silica for about 4 hours. A free flowing homogeneous mixture was obtained. A series of clean, cold rolled steel bars 1″ x 5″ x 0.060″ were heated to 200° C. and then immersed in a fluidized-bed of the above powder. After removal of the bars from the fluidized-bed, they were returned to the oven for 2 minutes, and then cooled to room temperature. A smooth, continuous, tough coating was obtained that was not affected by a 30-minute immersion in acetone at room temperature.

In Example V above, the blend of resin and boron trifluoride-2-ethylhexylamine complex was held at the elevated, 130° C. temperature after mixing until there was a noticeable increase in viscosity, and only then was the blend rapidly cooled and solidified. This partial reaction, or so-called B-staging, of the resin and hardener-catalyst provides an effective means for pre-determining the curing characteristics of the final resin composition. The resin-catalyst reaction requires elevated temperature, and can be arrested at an interim stage by cooling to room temperature and later resumed, and accelerated by the association with anhydride hardener, when the complete coating composition is brought in contact with heated objects in the fluidized-bed, or dry spray coating techniques.

The activity of boron trifluoride-amine complexes, of course, differs from one such complex to another, but the less reactive complexes can be given apparent reactivity in the finished composition by suitable extension and control of the B-staging above mentioned. The limiting factor on the B-staging, or pre-reaction of resin and $BF_3$-amine complex is that the partially reacted material, after cooling to room temperature, being reduced to a powder, and combined with the desired amount of anhyride must provide a composition which will fuse and coalesce to a continuous coating upon heating to a temperature above about 100° C., and suitably in the 125°–200° C. range, when contacted by preheated objects in the manner described. It is preferable, however, to select a $BF_3$-amine complex which will impart the desired reactivity in the finished coating composition with a minimum of B-staging of resin and complex.

When coating articles with such modified compositions, the optimum degree of preheating of such articles may differ from one composition to another for the same type article, but this optimum temperature is also influenced by the bulk and heat retaining capacity of the article to be coated, as well as the thickness of coating desired. Similarly, the extent of oven heating, if any, which will be necessary to cure a coating, will be influenced by the bulk and heat capacity of the article.

For dry spray and fluidized-bed use, and powdered resin compositions may have particles distributed within the range of 5 to 600 microns, although somewhat smoother coatings are obtained if the maximum particle size is kept below about 400 microns.

Various changes and modifications in the hardeners and epoxy resin compositions containing such hardeners will occur to those skilled in the art, and to the extent that such changes and modifications are embraced by the appended claims, it is to be understood that they constitute part of the present invention.

I claim:

1. An epoxy resin coating composition adapted for low temperature film formation and rapid cure on preheated substrates, said composition comprising a uniform mixture of powdered components having a particle size within the range of about 5 to 600 microns, a first powder in said mixture consisting essentially of a partially reacted mixture of epoxy resin having an epoxy equivalency between 1.0 and 2.0, a molecular weight within the range of 450–2550, and a softening point above 65° C., and about 0.5 to 5% based on the weight of resin of a $BF_3$-amine complex soluble in said resin, and a second powder in said mixture consisting essentially of a solid, friable, non-agglomerable polycarboxylic acid anhydride, the amount of said second powder being sufficient to provide 0.25 to 1.0 equivalents of anhydride per equivalent of epoxy resin, and said composition having the characteristic of being stable to storage for long periods of time as free-flowing powder while fusing and coalescing to a continuous coating at a temperature above about 100° C. and the partial reaction of the components of said first powder being so controlled as to impart to said composition the further characteristic of fusing and coalescing rapidly to a continuous coating at a temperature within the range of 125 to 200° C.

2. An epoxy resin coating composition as defined in claim 1, wherein said first powder contains at least one BF$_3$-amine complex selected from the group consisting of BF$_3$-monoethylamine, BF$_3$-dibenzylamine, BF$_3$-hexylamine, BF$_3$-2-ethylhexylamine, and BF$_3$-piperidine.

3. An epoxy resin composition as defined in claim 1, wherein said second powder contains at least one polycarboxylic acid anhydride selected from the group consisting of tetrahydrophthalic anhydride, cyclopentane tetracarboxylic dianhydride, hexachloroendomethylene tetrahydrophthalic anhydride, pyromellitic dianhydride, trimellitic anhydride, benzophenone tetracarboxylic dianhydride, and glycerol tris trimellitate anhydride.

4. An epoxy resin coating composition as defined in claim 1, wherein said mixture of powdered components contains separate particles of colloidal silica in the proportion of about 0.5 to 3 parts per 100 parts of epoxy resin.

5. An epoxy resin coating composition as defined in claim 1, wherein said first powder has uniformly blended in the particles thereof at least one of the supplements comprising coloring agents and filler components, said coloring agents and filler components having a particle size less than 325 mesh, and the combined amounts thereof constituting less than 70% of the total weight of said coating composition.

6. An epoxy resin coating composition as defined in claim 5, wherein the combined amount of coloring agents and filler components is less than 25% of the total weight of the coating composition, thereby providing enhanced flexibility and impact resistance to coatings formed therefrom.

7. An epoxy resin coating composition as defined in claim 5, wherein the mixture of powdered components contains separate particles of colloidal silica in the proportion of about 0.5 to 3 parts per 100 parts by weight of epoxy resin.

8. An epoxy resin coating composition as defined in claim 1, wherein all particles in said mixture of powdered components are smaller than 400 microns in size.

9. The process for preparing an epoxy resin coating composition as defined in claim 1, that comprises heating the epoxy resin to a temperature above its softening point and in the range of about 200–260° F., rapidly mixing and dissolving the BF$_3$-amine complex in the softened resin while limited reaction takes place between the resin and complex, then rapidly cooling and solidifying the reaction mixture, grinding the same to an activated resin powder sufficiently fine so that 95% will pass a 60 mesh sieve, separately grinding the anhydride component sufficiently fine so that 95% will pass a 100 mesh sieve, and then uniformly blending the resin and anhydride powders, and so controlling the time of maintained elevated temperature after addition of the BF$_3$-amine complex and the extent of reaction with said resin that the mixture of resin powder and anhydride will rapidly fuse and coalesce to a continuous coating at a temperature within the range of about 125 to 200° C.

10. The process as defined in claim 9, wherein coloring agents and filler components desired in the composition are uniformly blended with the resin in the plastic to fluid state at a temperature which may exceed 260° F. and the mixture is then adjusted to a temperature within the range of about 200–260° F. before addition of the BF$_3$-amine complex.

11. The process as defined in claim 9, wherein the BF$_3$-amine complex is added as a solid to the heated resin.

12. The process as defined in claim 9, wherein addition of the BF$_3$-amine complex is facilitated by first dissolving the same in an amount not exceeding an equal amount by weight of an inert polyglycol solvent.

References Cited

UNITED STATES PATENTS

| | | | |
|---|---|---|---|
| 3,214,403 | 10/1965 | Peerman | 117—21 |
| 2,839,495 | 6/1958 | Carey | 260—47 |
| 3,039,987 | 6/1962 | Elbling. | |
| 3,102,043 | 8/1963 | Winthrop et al. | 260—37 |
| 3,159,595 | 12/1964 | Parry | 260—37 |

FOREIGN PATENTS

| | | |
|---|---|---|
| 987,422 | 3/1965 | Great Britain. |
| 1,283,850 | 1/1962 | France. |
| 631,997 | 11/1963 | Belgium. |

JULIUS FROME, *Primary Examiner.*

J. E. CALLAGHAN, *Assistant Examiner.*